(12) United States Patent
Ueki

(10) Patent No.: US 11,928,364 B2
(45) Date of Patent: Mar. 12, 2024

(54) MEMORY SYSTEM AND METHOD

(71) Applicant: KIOXIA CORPORATION, Tokyo (JP)

(72) Inventor: Hotaka Ueki, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 15 days.

(21) Appl. No.: 17/898,381

(22) Filed: Aug. 29, 2022

(65) Prior Publication Data

US 2023/0305748 A1 Sep. 28, 2023

(51) Int. Cl.
*G06F 3/06* (2006.01)

(52) U.S. Cl.
CPC .......... *G06F 3/0659* (2013.01); *G06F 3/0656* (2013.01); *G06F 3/0658* (2013.01); *G06F 3/0679* (2013.01); *G06F 3/0604* (2013.01)

(58) Field of Classification Search
None
See application file for complete search history.

(56) References Cited

U.S. PATENT DOCUMENTS

| | | | |
|---|---|---|---|
| 10,976,957 B2 | 4/2021 | Wu et al. | |
| 2010/0063825 A1* | 3/2010 | Williams | G11B 27/038 |
| | | | 704/500 |
| 2020/0409855 A1 | 12/2020 | Subbarao et al. | |
| 2021/0011639 A1* | 1/2021 | Hatfield | G06F 3/0608 |
| 2021/0064289 A1* | 3/2021 | Kanno | G06F 3/064 |
| 2021/0064290 A1* | 3/2021 | Kanno | G06F 3/0604 |
| 2021/0157528 A1 | 5/2021 | Kim et al. | |
| 2022/0334771 A1* | 10/2022 | Kanno | G06F 3/0604 |

* cited by examiner

*Primary Examiner* — Kevin Verbrugge
(74) *Attorney, Agent, or Firm* — Kim & Stewart LLP

(57) ABSTRACT

A memory system includes a non-volatile memory and a memory controller. The memory controller is configured to queue write commands received from a host. The commands may include a first write command to write first write data associated with a first stream and a second write command to write second write data associated with a second stream. When the first and second write commands are queued, the memory controller repeatedly performs a sequence of a first operation of acquiring a predetermined amount of the first write data from the host and then transmitting to the non-volatile memory, and a second operation of acquiring the predetermined amount of the second write data from the host and then transmitting to the non-volatile memory. The second operation in the sequence is started after completion of the first operation in the sequence.

20 Claims, 12 Drawing Sheets

MEMORY SYSTEM AND METHOD

CROSS-REFERENCE TO RELATED APPLICATION

This application is based upon and claims the benefit of priority from Japanese Patent Application No. 2022-046000, filed Mar. 22, 2022, the entire contents of which are incorporated herein by reference.

FIELD

Embodiments described herein relate to a memory system and a method.

BACKGROUND

A multi-stream write function is known as a function of a memory system such as a solid state drive (SSD). The memory system having the multi-stream write function receives a write command including a stream identifier (hereinafter, stream ID). The memory system writes data (hereinafter, also referred to as write data) of which writing is requested by the received write command to a block associated with the stream ID. As a result, frequency of performing garbage collection (may be referred to as compaction) is reduced, and performance and lifetime of the memory system can be improved.

DETAILED DESCRIPTION

Embodiments provide a memory system and a method of achieving suitable writing performance.

In general, according to an embodiment, a memory system includes a non-volatile memory and a memory controller. The memory controller is configured to queue write commands received from a host. The commands may include a first write command that is an instruction to write first write data associated with a first stream and a second write command that is an instruction to write second write data associated with a second stream. When the first and second write commands are queued, the memory controller repeatedly performs a sequence of a first operation of acquiring a predetermined amount of the first write data from the host and then transmitting the predetermined amount of the first write data to the non-volatile memory, and a second operation of acquiring the predetermined amount of the second write data from the host and then transmitting the predetermined amount of the second write data to the non-volatile memory. The second operation in the sequence is started after completion of the first operation in the sequence.

Hereinafter, a memory system and a method according to embodiments will be described in detail with reference to the accompanying drawings. It is noted that the present disclosure is not limited to these embodiments.

First Embodiment

Figure 1:
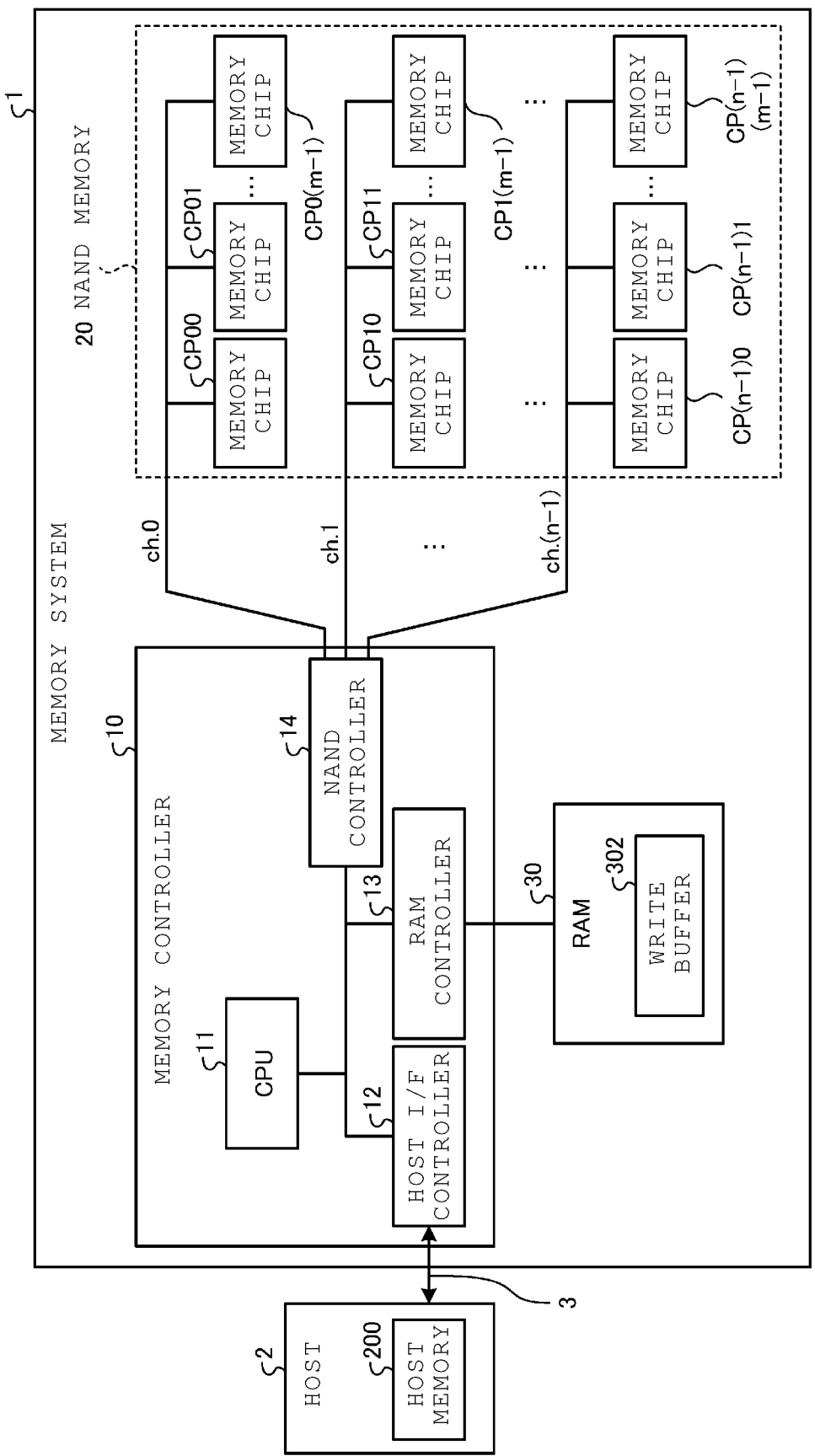
FIG. 1 is a block diagram schematically illustrating an example of a configuration of a memory system according to a first embodiment.

FIG. 1 is a block diagram schematically illustrating an example of a configuration of a memory system according to a first embodiment.

A memory system 1 can be connected to a host 2 via a communication path 3. The host 2 is a computer. The computer includes, for example, a personal computer, a portable computer, a server, or a portable communication device. The memory system 1 functions as an external storage device of the host 2. The host 2 includes a memory (denoted as a host memory 200). The host memory 200 stores data to be transmitted to the memory system 1.

The memory system 1 includes a memory controller 10, a NAND type flash memory (NAND memory) 20, and a random access memory (RAM) 30. The NAND memory 20 is an example of a non-volatile memory. The NAND memory 20 is used as a storage. It is noted that the type of non-volatile memory is not limited to a NAND flash memory. For example, a NOR type flash memory or the like may be employed as the non-volatile memory.

The RAM 30 is a volatile memory in which various kinds of information for the memory controller 10 to control the NAND memory 20 are stored. Specifically, the RAM 30 stores a queues of commands, buffers transfer data between the host 2 and the NAND memory 20, and buffers or caches various kinds of management information. Details of a configuration of the RAM 30 will be described below. The RAM 30 includes at least a write buffer 302. The write buffer 302 stores write data transferred from the host 2.

It is noted that any type of memory may be applied as the RAM 30. For example, a dynamic random access memory (DRAM), a static random access memory (SRAM), or a combination thereof may be applied as the RAM 30. Further, instead of the RAM 30, a volatile or non-volatile memory having a processing speed higher than that of the storage may be applied. The RAM 30 may be built in the memory controller 10.

The memory controller 10 includes a central processing unit (CPU) 11, a host interface (host I/F) controller 12, a RAM controller (RAMC) 13, and a NAND controller (NANDC) 14. The CPU 11, the host I/F controller 12, the RAMC 13, and the NANDC 14 are electrically connected via a bus.

The memory controller 10 is configured as a system-on-a-chip (SoC). Alternatively, the memory controller 10 may be configured with a plurality of chips. The memory controller 10 may be configured as one SoC including the RAM 30.

The host I/F controller 12 controls a signal transferred via the communication path 3. The host I/F controller 12 receives various commands from the host 2. The host I/F controller 12 executes, for example, data transfer between the host 2 and the RAM 30. The RAMC 13 controls the RAM 30. The NANDC 14 controls the NAND memory 20. The NANDC 14 executes, for example, data transfer between the RAM 30 and the NAND memory 20.

The CPU 11 is a processor that executes control of the entire memory controller 10. The CPU 11 executes the control on the basis of a firmware program.

It is noted that some or all of the control executed by the CPU 11 as a processor may be executed by a hardware circuit. Some or all of the control executed by the CPU 11 as a processor may be executed by a field-programmable gate array (FPGA) or an application specific integrated circuit (ASIC). Some or all of the functions of any components such as the host I/F controller 12 and the NANDC 14 may be implemented by the CPU 11.

The memory controller 10 may include another circuit in addition to the above-mentioned components. For example, the memory controller 10 may include an error correction circuit that executes error correction coding on the data to be written to the NAND memory 20 and executes error correction on the data read from the NAND memory 20.

The NAND memory 20 includes one or more memory chips CP. When the NAND memory 20 includes two or more memory chips CP, the two or more memory chips CP may be connected to the memory controller 10 via two or more channels ch.

According to the example illustrated in FIG. 1, the memory system 1 has n channels (n is an integer of 3 or more) ch.0 to ch.(n-1). The n channels ch.0 to ch. (n-1) are connected to the memory controller 10, and m memory chips CP (m is an integer of 3 or more) are connected to each channel ch. That is, the NAND memory 20 includes (n x m) memory chips CP. Hereafter, in some cases, among the m memory chips CP connected to the channel ch.a (a is an integer from 0 to (n-1)), the memory chip CP connected to the b-th (b is an integer from 1 to m) from the memory controller 10 side may be referred to as a memory chip CPab.

Each memory chip CP is connected to one of the n channels ch.0 to ch.(n-1). Each channel ch is configured with a wiring group which conforms to a certain communication standard and includes an I/O signal line and a control signal line group. The I/O signal line is a signal line for transferring data, addresses, and commands. A bit width of the I/O signal line is not limited to 1 bit. The control signal line group is a group of, for example, a signal line for transferring a write enable (WE) signal, a signal line for transferring a read enable (RE) signal, a signal line for transferring a command latch enable (CLE) signal, a signal line for transferring an address latch enable (ALE) signal, a signal line for transferring a write protect (WP) signal, and the like.

The memory controller 10 can control each channel ch individually. The memory controller 10 can allow the n memory chips CP connected to different channels ch to operate in parallel by controlling the n channels ch.0 to ch.(n-1) simultaneously and individually.

Figure 2:
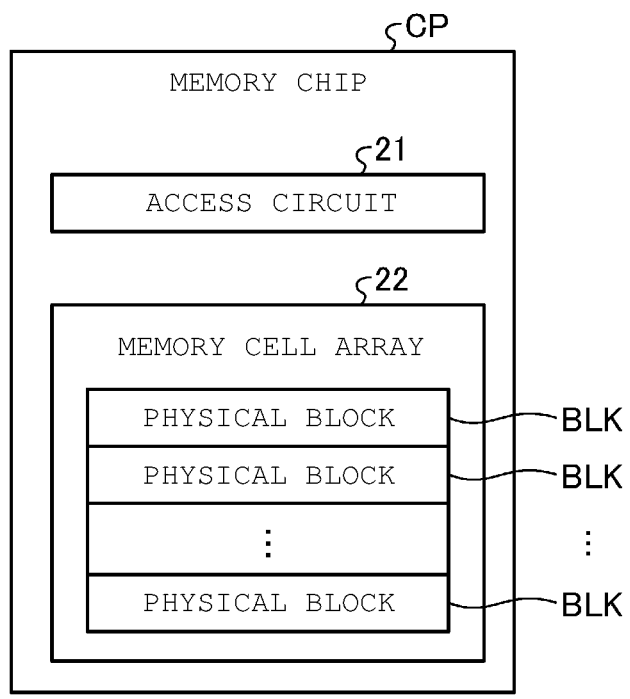
FIG. 2 is a block diagram schematically illustrating an example of a configuration of a memory chip according to the first embodiment.

FIG. 2 is a block diagram schematically illustrating an example of a configuration of the memory chip CP according to the first embodiment. It is noted that each of the (n×m) memory chips CP in the NAND memory 20 has the same configuration.

The memory chip CP includes an access circuit 21 and a memory cell array 22.

The access circuit 21 includes a row decoder, a column decoder, a sense amplifier, a voltage generation circuit, a sequencer, a data buffer, and the like. The memory controller 10 transmits an access instruction to the memory chip CP. The access instruction includes a write instruction, a read instruction, and an erase instruction. The access circuit 21 executes an operation on the memory cell array 22 in accordance with the access instruction from the memory controller 10 among a data writing operation, a data reading operation, and a data erasing operation.

The memory cell array 22 has a configuration in which a plurality of memory cells are arranged two-dimensionally or three-dimensionally. The memory cell array 22 includes a plurality of physical blocks BLK. The physical block BLK is a unit of the data erasing operation with respect to the memory cell array 22. That is, the entire data stored in one physical block BLK are collectively erased by the access circuit 21.

Figure 3:
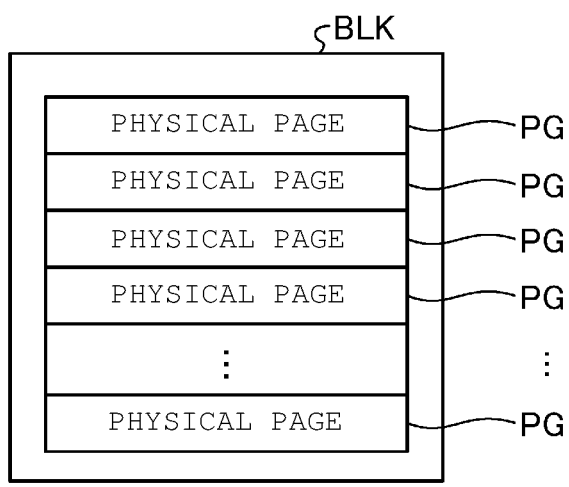
FIG. 3 is a block diagram schematically illustrating an example of a configuration of a physical block in the first embodiment.

FIG. 3 is a block diagram schematically illustrating an example of a configuration of the physical block BLK in the first embodiment.

The physical block BLK includes a plurality of physical pages PG. Each physical page PG is a unit of the data writing operation and the data reading operation, which are executed by the access circuit 21. That is, the access circuit 21 collectively writes data to one physical page PG or collectively reads data stored in one physical page PG.

The memory controller 10 executes bank interleaving. In the bank interleaving, the memory controller 10 groups a plurality of the memory chips CP connected to the different channels ch into one bank and sets a plurality of the banks. Then, the memory controller 10 issues an access instruction to one or more memory chips CP belonging to another bank while one or more memory chips CP belonging to one bank are accessing the memory cell array 22 thereof. According to the bank interleaving, a total time required for data transfer between the NAND memory 20 and the memory controller 10 is reduced.

It is noted that the element configuring the bank does not need to be the memory chip CP. For example, the memory chip CP may have a plurality of planes. The memory cell array 22 is divided into the plurality of planes, each of which has a plurality of physical blocks BLK, and the access circuit 21 including the row decoder, the column decoder, and the like is provided for each plane. In such a case, the access circuit 21 can execute the writing, reading, or erasing operation on the plurality of planes simultaneously. When the memory chip CP is configured in this manner, the memory controller 10 may set a group in which one plane is collected from each of different channels ch as one bank.

In the first embodiment, the memory controller 10 causes the n memory chips CP connected to each of the n different channels ch to operate in parallel, and the memory controller 10 also causes the memory chips CP belonging to different banks to operate in parallel by the bank interleaving. That is, the memory controller 10 can cause the (n×m) memory chips CP to operate in parallel. Therefore, each of the (n×m) memory chips CP can be regarded as an individual element operated in parallel, that is, a parallel operating element. It is noted that, in the above-mentioned configuration in which the planes are the elements of the bank, each plane can be regarded as a parallel operating element.

The memory controller 10 sets a plurality of logical blocks. Each logical block is configured with a group of physical blocks BLK selected from different parallel operating elements.

Figure 4:
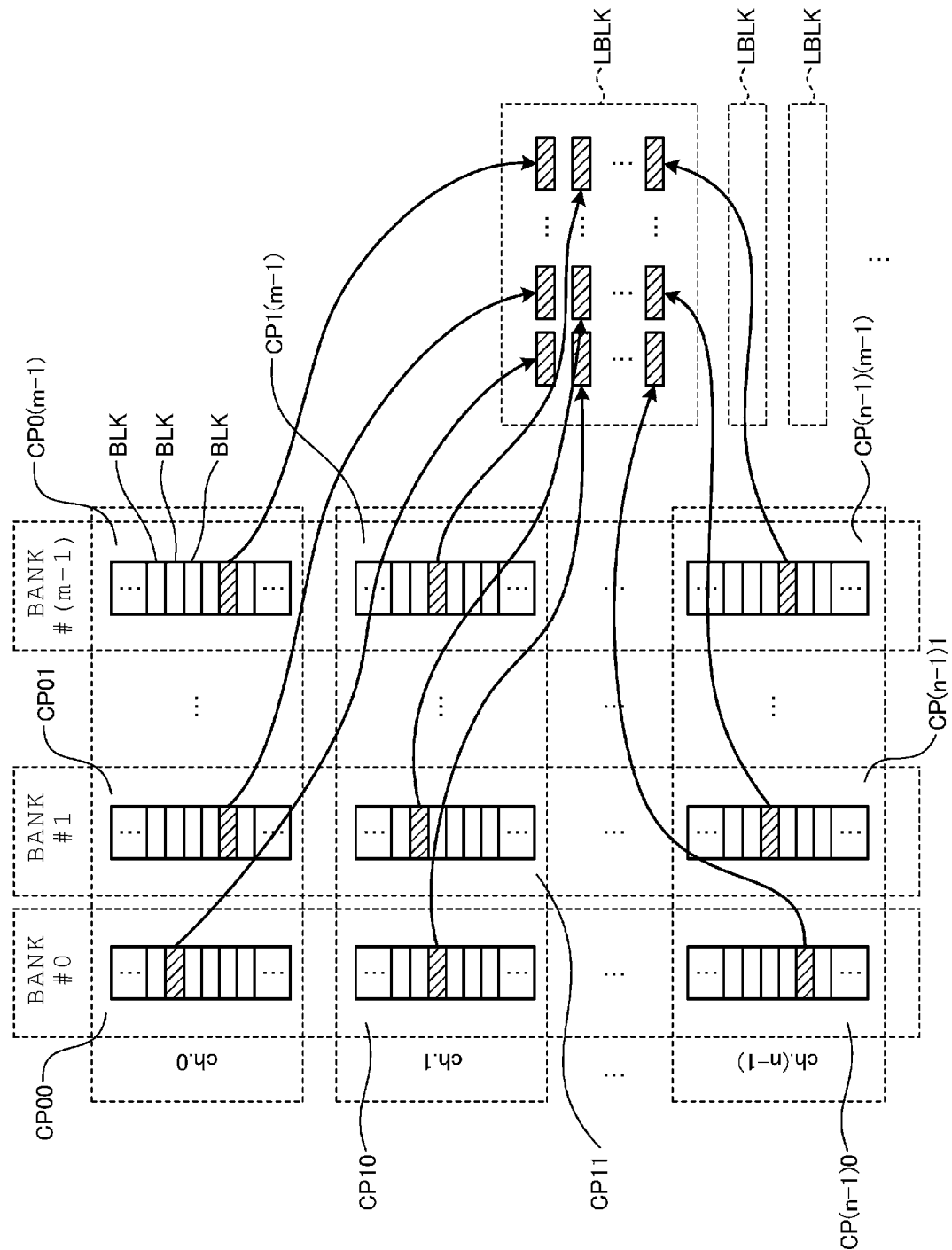
FIG. 4 is a diagram schematically illustrating an example of a configuration of a logical block in the first embodiment.

FIG. 4 is a diagram schematically illustrating an example of a configuration of the logical block in the first embodiment. In the example illustrated in FIG. 4, one physical block BLK with diagonal hatching is selected from each memory chip CP which is a parallel operating element, and one logical block LBLK is configured from the total (n×m) physical blocks BLK.

It is noted that, in the above example, the logical block LBLK is configured with the physical blocks BLK selected from each of all the parallel operating elements. The above-mentioned logical block LBLK configuration is an example. For example, one logical block LBLK may be configured with physical blocks BLK selected from each of some parallel operating elements instead of all the parallel operating elements. Further, one logical block LBLK may be configured with the two or more physical blocks BLK selected from each of the parallel operating elements.

Figure 5:
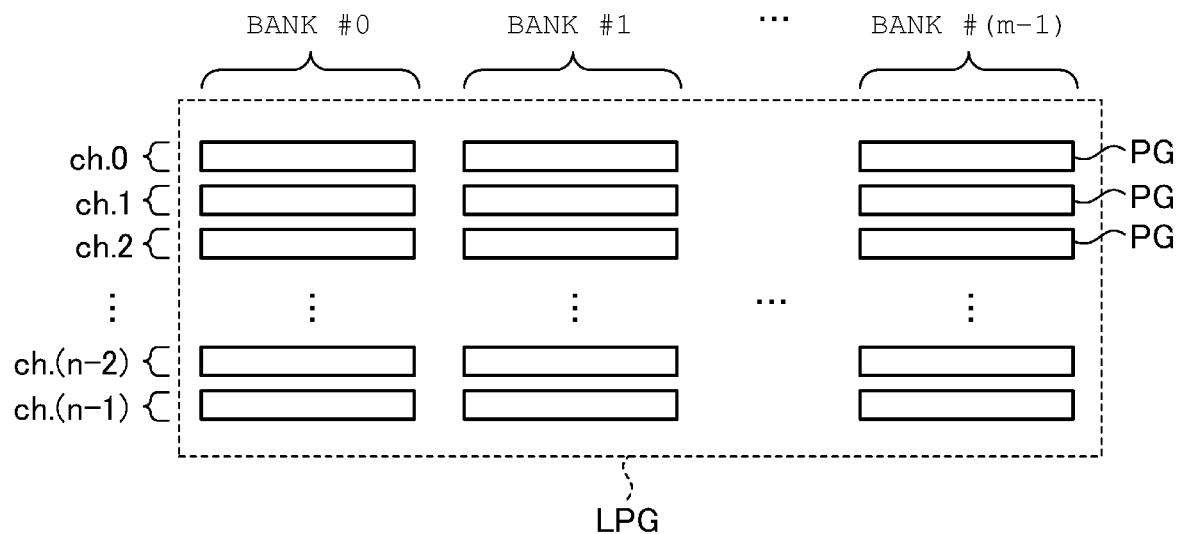
FIG. 5 is a diagram schematically illustrating an example of a configuration of a logical page in the first embodiment.

The memory controller 10 manages one logical block LBLK as a unit of accessing, particularly writing in the present embodiment. For example, when the memory controller 10 performs a writing operation with respect to the NAND memory 20, as illustrated in FIG. 5, the memory controller 10 performs the writing operation with respect to a group of physical pages PG selected from the physical blocks BLK configuring one logical block LBLK. A group of physical pages PG selected from the physical blocks BLK configuring one logical block LBLK is referred to as a logical page LPG.

Further, the memory system 1 has a multi-stream write function. The data (denoted as write data) transmitted from the host 2 to the memory system 1 includes an attribute called a stream. The memory system 1 can receive a plurality of pieces of the write data belonging to different streams. The memory system 1 writes the write data for each stream to different logical blocks LBLK. Hereinafter, in some cases, the data belonging to a certain stream may be referred to as data of a stream.

Figure 6:
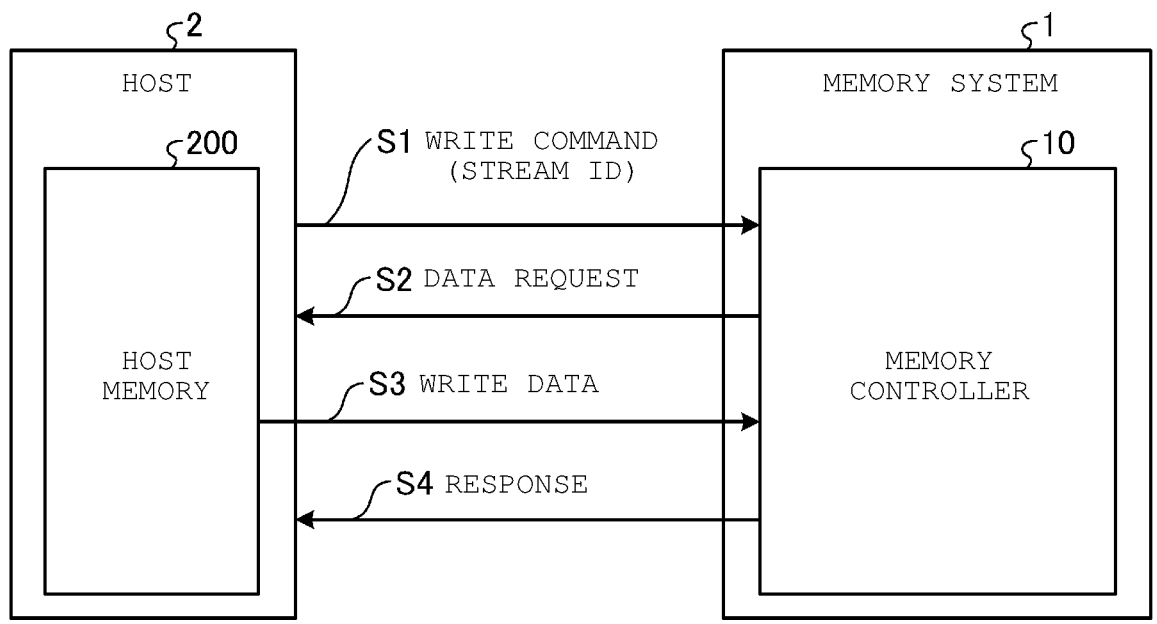
FIG. 6 is a diagram schematically illustrating an example of communication between a host and the memory system according to the first embodiment.

FIG. 6 is a diagram schematically illustrating an example of communication between the host 2 and the memory system 1 according to the first embodiment. FIG. 6 illustrates an example of communication when performing a data writing operation of writing data from the host 2 into the memory system 1.

During the data writing operation, first, the host 2 issues a write command, and the memory system 1 receives the write command (S1). The write command includes a stream ID representing a stream to which data of a writing target (that is, write data) belongs.

The memory system 1 transmits a data request of requesting transmission of the write data corresponding to the received write command to the host 2 (S2). The host 2 includes the host memory 200, and the write data are prepared in the host memory 200. The host 2 transmits the write data prepared in the host memory 200 to the memory system 1 in response to the data request (S3).

The memory system 1 stores the write data received from the host 2 in a write buffer (write buffer 302 described below). When the memory system 1 stores the write data in the write buffer 302, the memory system 1 transmits a write completion response to the host 2 (S4).

As described above, the memory controller 10 switches the logical block LBLK of a writing destination for each stream. Further, the memory controller 10 writes data to the NAND memory 20 in units of a logical page LPG. For this reason, the memory controller 10 writes only data of a single stream to one logical page LPG. For example, when the writing of the data of two or more streams is requested at the process of S1 a plurality of times, the memory controller 10 writes data of a certain stream (referred to as data of a first stream) to a certain logical page LPG, and then writes data of another stream (referred to as data of a second stream) to another logical page LPG. Therefore, during the writing of the data of the first stream, the data of the second stream is buffered in any of locations until the turn of writing to the NAND memory 20 arrives.

In the first embodiment, the memory controller 10 is configured to write to the NAND memory 20 in any of a first mode and a second mode.

The first mode is an operational mode in which the data of the second stream is buffered in the write buffer 302 while the writing of the data of the first stream to the NAND memory 20 is being executed. In the first mode, when the memory controller 10 receives a plurality of write commands, the memory controller 10 acquires the write data by transmitting the data request to the host 2 for each write command regardless of which stream the write data belongs to. Then, the memory controller 10 stores the acquired write data in the write buffer 302. The memory controller 10 retrieves the data of the first stream from the write data stored in the write buffer 302 by an amount of the logical page LPG and writes the data of the first stream to the NAND memory 20. When the writing of the data of the first stream to the NAND memory 20 is completed, the memory controller 10 retrieves the data of the second stream from the write data stored in the write buffer 302 by the amount of the logical page LPG and writes the data of the second stream to the NAND memory 20.

The second mode is an operational mode in which the data of the second stream is buffered in the host memory 200 while the writing of the data of the first stream to the NAND memory 20 is being executed. In the second mode, when the memory controller 10 receives the plurality of write commands, the memory controller 10 transmits the data request with respect to the write command including the stream ID of the first stream to the host 2, and refrains from transmission of the data request with respect to the write commands including the stream IDs of streams other than the first stream to the host 2. Therefore, at this time, the memory controller 10 does not store the data of the second stream in the write buffer 302, but the memory controller 10 can store the data of the first stream. The memory controller 10 sequentially acquires only the data of the first stream for up to the logical page LPG and sequentially inputs the acquired data of the first stream to one logical page LPG of the NAND memory 20. When only the data of the first stream is acquired and the data for up to the logical page LPG is input, the memory controller 10 switches the data of an acquisition target from the data of the first stream to the data of another stream (for example, the second stream) and executes the same processing with respect to the data of the second stream as the processing executed with respect to the data of the first stream. In this manner, the operation of acquiring only the data of a single stream, storing the data in the write buffer 302, and then inputting the data to the NAND memory 20 is executed while switching a target stream every time an amount of the input data reaches that for the logical page LPG.

In the first mode, the write buffer 302 may store data of various streams. That is, data transfer for a plurality of the streams may occur in the write buffer 302. For example, when the writing of two streams with approximately the same workload is requested from the host 2, the data of another stream is stored in the write buffer 302 while the writing of the data of one stream to the NAND memory 20 is being executed. As a result, the capacity of the write buffer 302 that can store data of a stream during writing of data of the stream to the NAND memory 20 is reduced. As a result, the efficiency of the data transfer from the host 2 to the NAND memory 20 is reduced.

In the second mode, the data of another stream is not stored in the write buffer 302, while the writing of the data of one stream to the NAND memory 20 is being executed. Therefore, since the entire capacity of the write buffer 302 can be used for transferring data of a stream during the writing of data of the same stream to the NAND memory 20, the efficiency of data transfer from the host 2 to the NAND memory 20 can be improved.

Hereinafter, when writing of the plurality of streams is requested from the host 2, the stream of the data in which the writing to the NAND memory 20 is being executed is expressed as a target stream, and a stream other than the target stream is expressed as a non-target stream.

Figure 7:
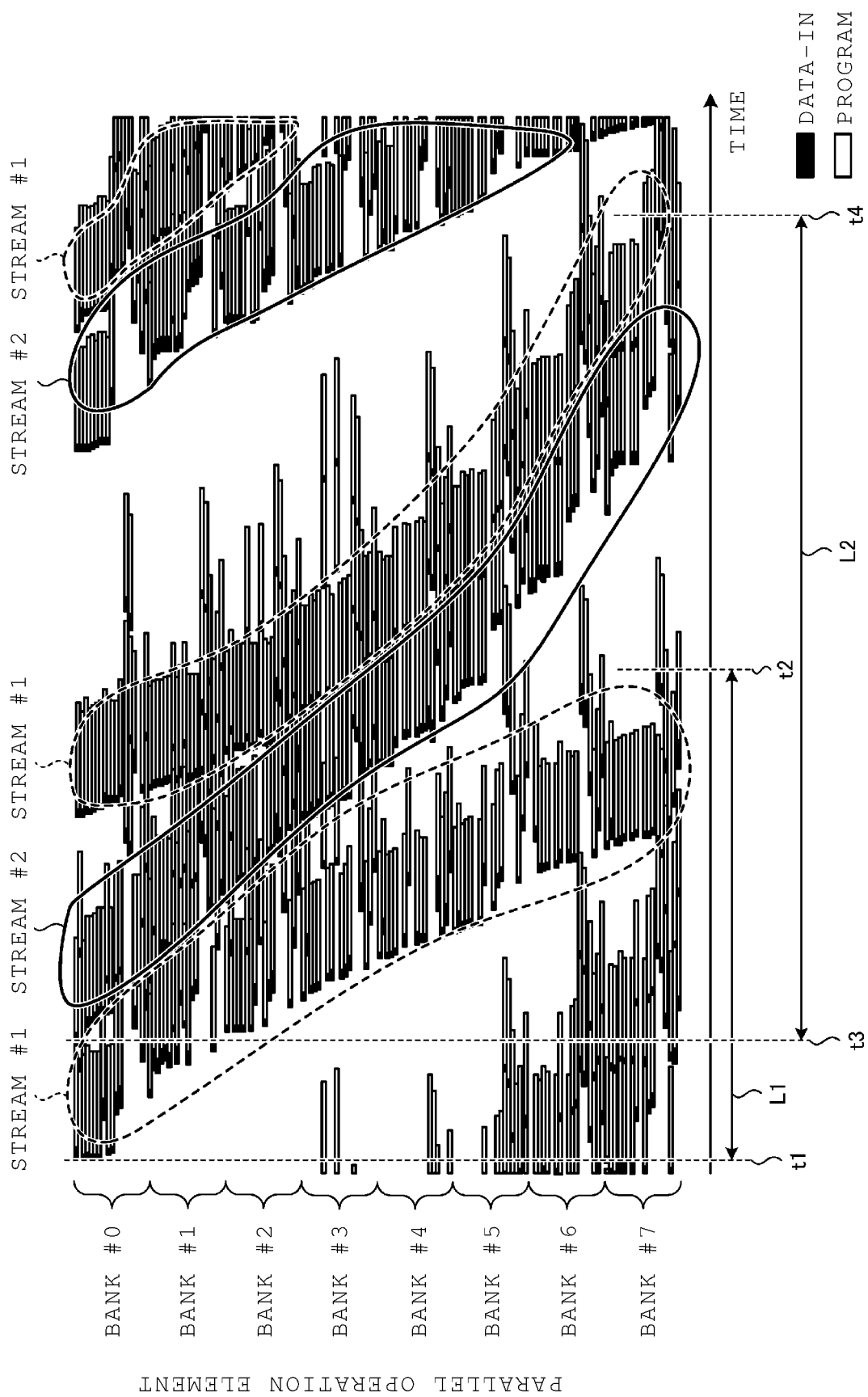
FIG. 7 is a timing chart schematically illustrating an example of a write operation in a first mode according to the first embodiment.

FIG. 7 is a timing chart schematically illustrating an example of a timing of the data transfer between the memory controller 10 and the NAND memory 20 during the write operation in the first mode according to the first embodiment for each parallel operating element. It is noted that, in FIG. 7, as an example, n is 18 and m is 8. Further, a stream of which stream ID is X (X is, for example, an integer of 1 or more) is referred to as stream #X. Further, it is assumed that the writing of the data of the stream #1 and the writing of the data of the stream #2 are requested by the host 2.

As illustrated in FIG. 7, when focusing on the communication between the memory controller 10 and the NAND memory 20, the writing of the data of the stream #1 for one logical page LPG and the writing of the data of the stream #2 for one logical page LPG are executed alternately.

The data writing from the memory controller 10 to one parallel operating element (in this case, one memory chip CP) includes two processes, that is, a process of inputting the data for one physical page PG from the memory controller 10 to the memory chip CP and a process of writing the data for one physical page PG to the memory cell array 22 by the access circuit 21 of the memory chip CP. The process of inputting the data for one physical page PG from the memory controller 10 to the memory chip CP is called a data-in. The process in which the access circuit 21 of the memory chip CP writes the data for one physical page PG to the memory cell array 22 is called a program. The channel ch is used for the data-in, but not for the program. The memory controller 10 can execute the data-in so as to overlap in time with respect to the 18 memory chips CP configuring one bank.

However, as described above, in the first mode, the capacity that can be used for transferring the data of the target stream among the total capacity of the write buffer 302 is small. Therefore, in some case, the memory controller 10 cannot acquire the data of the target stream for one bank collectively from the write buffer 302. In such a case, the memory controller 10 transfers only the data that can be acquired from the write buffer 302 among the data for one bank to the NAND memory 20. After that, when remaining data among the data for one bank is stored in the write buffer 302, the memory controller 10 transfers the remaining data to the NAND memory 20. Therefore, the time required for the data-in of the data for one logical page LPG is longer than that of the case where the data-in of the data for one bank can be executed simultaneously, and the efficiency of the data writing from the memory controller 10 to the NAND memory 20 is deteriorated.

Figure 8:
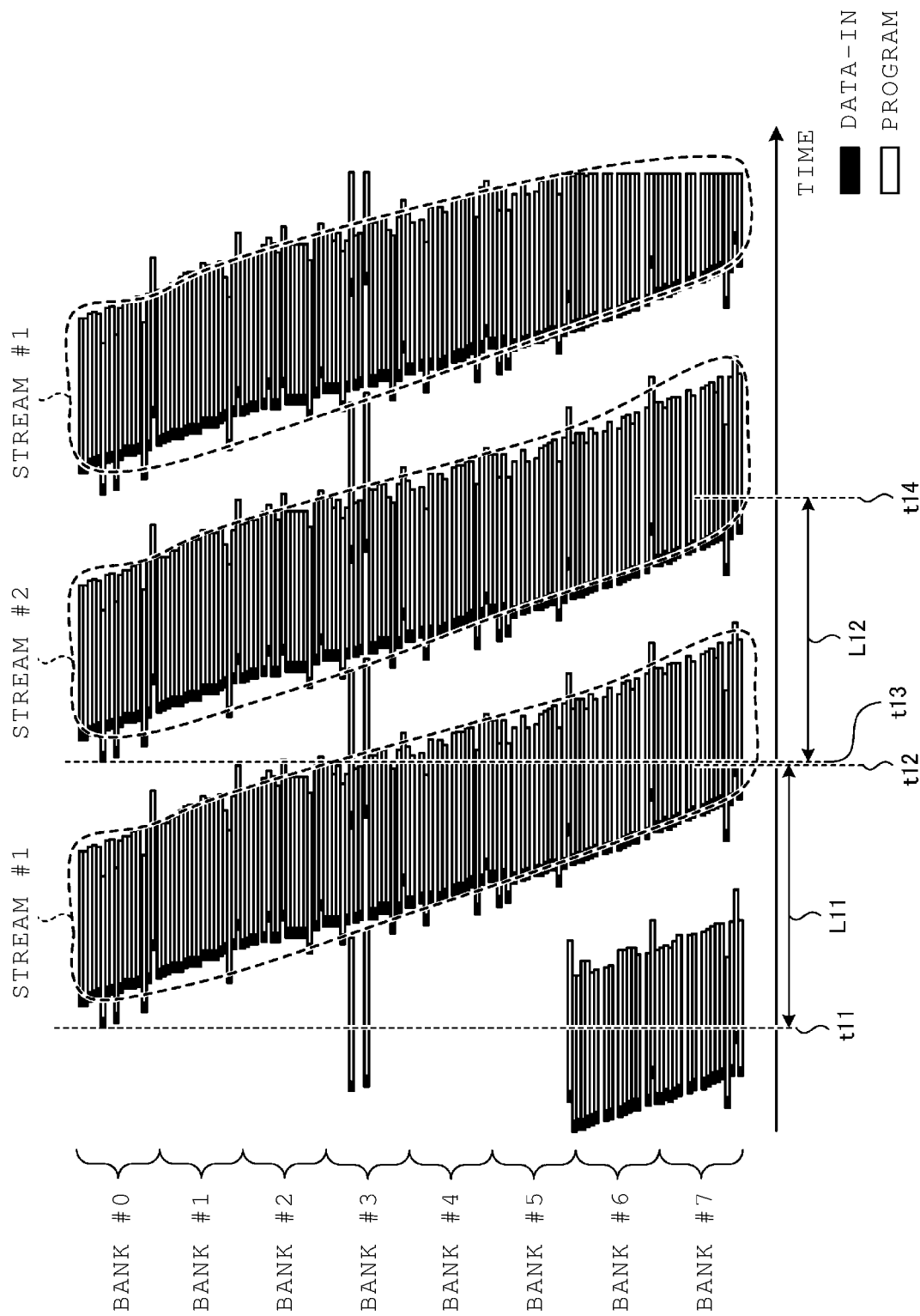
FIG. 8 is a timing chart schematically illustrating an example of a write operation in a second mode according to the first embodiment.

FIG. 8 is a timing chart schematically illustrating an example of a timing of the data transfer between the memory controller 10 and the NAND memory 20 during the write operation in the second mode according to the first embodiment for each parallel operating element. It is noted that, also in FIG. 8, n is 18 and m is 8.

As illustrated in FIG. 8, when focusing on the communication between the memory controller 10 and the NAND memory 20, the writing of the data of the stream #1 for one logical page LPG and the writing of the data of the stream #2 for one logical page LPG are executed alternately.

In the second mode, the entire capacity of the write buffer 302 is used to transfer the data of the target stream. Therefore, it is unlikely that the data of the target stream cannot be collectively acquired from the write buffer 302 for one bank. Since the data-in of the data for one bank can be executed simultaneously, the time required for data-in of the data of one stream can be shortened, and the efficiency of data writing from the memory controller 10 to the NAND memory 20 can be improved.

In the first embodiment, the memory controller 10 operates in the first mode when the writing of the data of one or three or more streams or the writing of the data of the plurality of streams having a significant difference in the workload is requested from the host 2. When the writing of the data of the two streams having the same workload is requested from the host 2, the memory controller 10 operates in the second mode.

The method of measuring a workload ratio between the two streams is not limited to a specific method. As an example, the memory controller 10 measures a time length required for the data-in of the data for one logical page LPG for each stream and calculates the workload ratio between the two streams from the ratios of the measured time lengths.

In the example illustrated in FIG. 7, in the first mode, the memory controller 10 measures a time length L1 from a timing t1 when initial data-in of the data of a stream #1 is started to a timing t2 when the last data-in of the stream #1 is completed. Next, the memory controller 10 measures a time length L2 from a timing t3 when the initial data-in of the data of a stream #2 is started to a timing t4 when the last data-in is completed. Then, a ratio of L1 and L2 is defined as a workload ratio between the stream #1 and the stream #2.

Further, in the example illustrated in FIG. 8, in the second mode, the memory controller 10 measures a time length L11 from a timing t11 when the initial data-in of the data of a stream #1 is started to a timing t12 when the last data-in of the stream #1 is complete. Next, the memory controller 10 measures a time length L12 from a timing t13 when the initial data-in of the data of a stream #2 is started to a timing t14 when the last data-in is completed. Then, a ratio of L11 and L12 is defined as a workload ratio of the stream #1 and the stream #2.

The measurement of the workload ratio may be executed at a predetermined cycle or may be consistently executed.

Hereinafter, the time length required for the data-in of the data for one logical page LPG is referred to as a data-in time.

Figure 9:
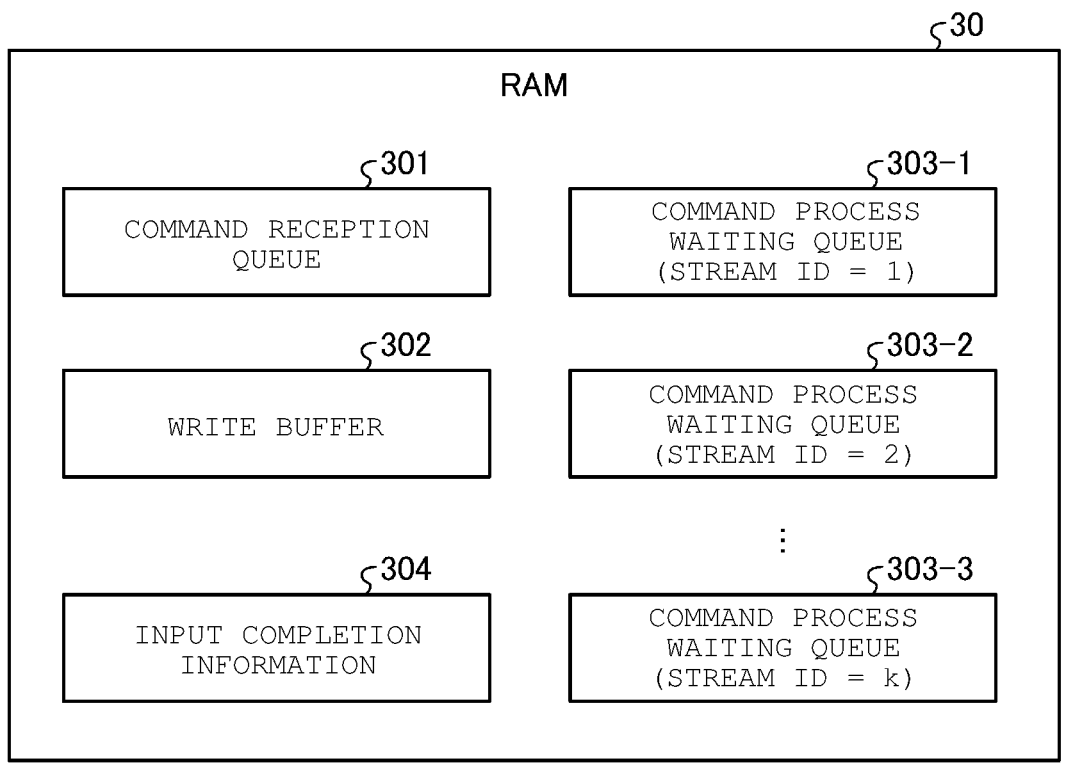
FIG. 9 is a block diagram schematically illustrating an example of various regions in a RAM according to the first embodiment.

FIG. 9 is a block diagram schematically illustrating an example of various regions in the RAM 30 according to the first embodiment.

The RAM 30 includes a command reception queue 301, the write buffer 302, and one or more command process waiting queues 303. The command reception queue 301 stores the write command received from the host 2 in the process of S1 in FIG. 6. The write buffer 302 stores the write data acquired from the host 2 in the process of S3 in FIG. 6.

The command process waiting queue 303 is provided for each stream. In the first mode, the write command stored in the command reception queue 301 is distributed to one or more command process waiting queues 303 on the basis of the stream ID in the write command.

Input completion information 304 is stored in the RAM 30. The input completion information 304 is information indicating whether the data-in of the data for one logical page LPG is completed.

In the memory controller 10, the operation of transferring the write data from the host 2 to the write buffer 302 and the operation of transmitting the write data in the write buffer 302 to the NAND memory 20 are executed asynchronously. The input completion information 304 is used to notify the start timing and the end timing of the data-in of the data for one logical page LPG between the operation of transferring the write data from the host 2 to the write buffer 302 and the operation of transmitting the write data in the write buffer 302 to the NAND memory 20.

Subsequently, the operation of the memory system 1 according to the first embodiment will be described.

Figure 10:
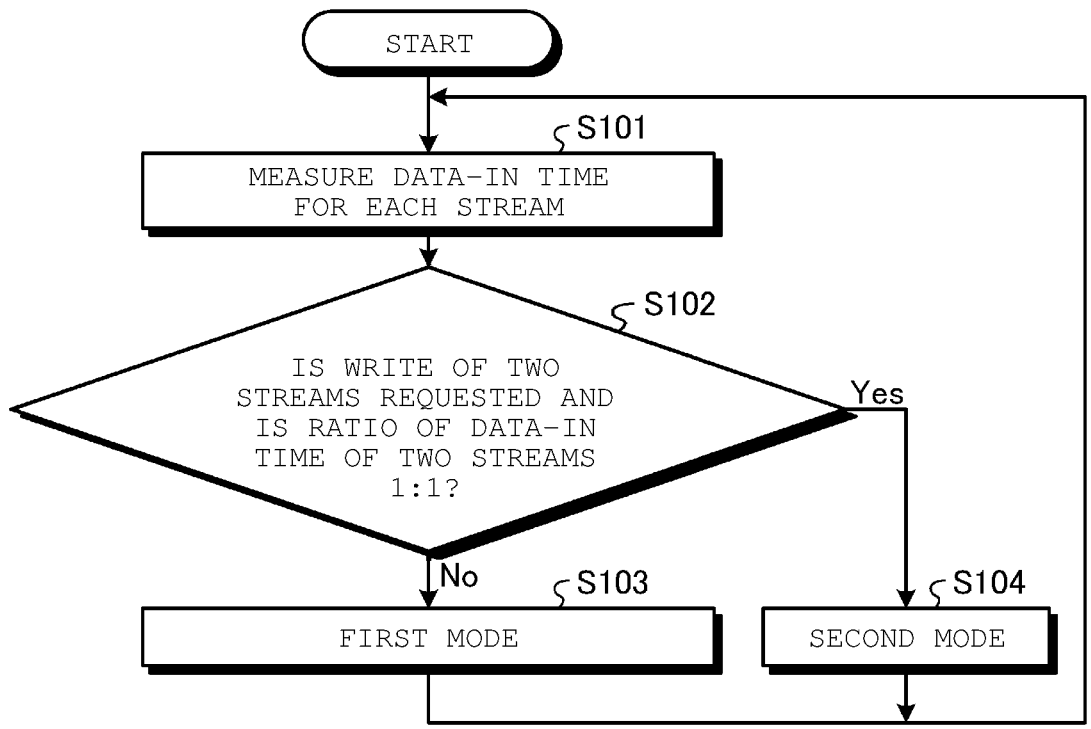
FIG. 10 is a flowchart illustrating an example of a procedure for switching operation modes by a memory controller according to the first embodiment.

FIG. 10 is a flowchart illustrating an example of a procedure for switching operational modes by the memory controller 10 according to the first embodiment.

The memory controller 10 measures the data-in time for each stream (S101). Then, the memory controller 10 determines whether the writing of the two streams is requested and the ratio of the data-in times of the two streams is 1:1 (S102).

When the writing of one or three or more streams is requested, or the ratio of the data-in times of the two streams is deviated from 1:1 (No in S102), the memory controller 10 sets the operational mode of the writing to the first mode (S103). When the writing of the two streams is requested and the ratio of the data-in times of the two streams is 1:1 (Yes in S102), the memory controller 10 sets the operational mode of the writing to the second mode (S104).

It is noted that the determination as to whether the ratio of the data-in times of the two streams is 1:1 does not need to be strict. For example, the memory controller 10 may determine that the ratio of the data-in times of the two streams is 1:1 when the deviation between the ratio of the data-in times of the two streams and 1:1 is equal to or less than a predetermined small value.

After S103 or S104, the control transitions to S101.

By repeatedly executing loop processing from S101 to S103 or S104, the switching of the operational modes in accordance with the workload ratio between the data transmitted from the host 2 to the memory system 1 can be implemented.

It is noted that an execution interval of the loop processing from S101 to S103 or S104 can be appropriately set. The loop processing from S101 to S103 or S104 may be consistently executed or may be executed at a particular time interval.

Subsequently, an operation in the first mode will be described with reference to FIGS. 11 and 12.

Figure 11:
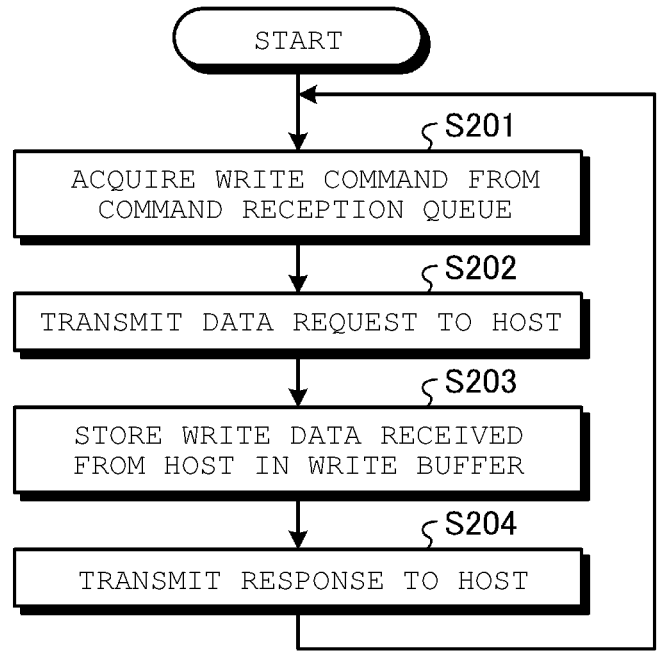
FIG. 11 is a flowchart illustrating an example of an operation in the first mode of processing a write command in a command reception queue by the memory controller according to the first embodiment.

FIG. 11 is a flowchart illustrating an example of the operation in the first mode of processing the write command in the command reception queue 301 by the memory controller 10 according to the first embodiment. The processes of S201 to S204 correspond to the processes of S1 to S4 in FIG. 6, respectively.

The write command received by the memory controller 10 by the process of S1 in FIG. 6 is stored in the command reception queue 301. In the first mode, the memory controller 10 acquires the write command from the command reception queue 301 (S201) and transmits the data request to the host 2 according to the acquired write command (S202). When the memory controller 10 receives the write data according to the data request, the memory controller 10 stores the write data in the write buffer 302 (S203). When the storage of the write data in the write buffer 302 is completed, the memory controller 10 transmits a response to the host 2 (S204).

A series of the processes of S201 to S204 are repeatedly executed.

Figure 12:
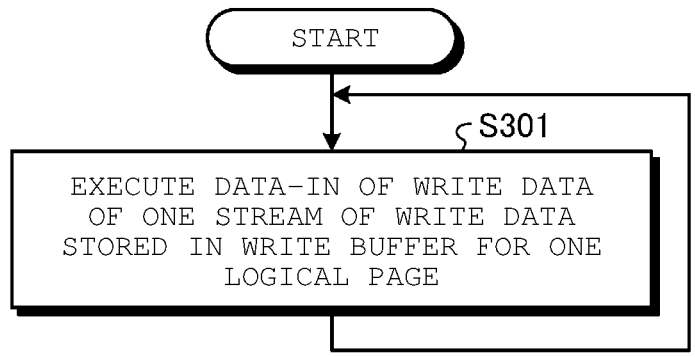
FIG. 12 is a flowchart illustrating an example of an operation in the first mode of processing write data in a write buffer by the memory controller according to the first embodiment.

FIG. 12 is a flowchart illustrating an example of the operation in the first mode of processing the write data in the write buffer 302 by the memory controller 10 according to the first embodiment.

The memory controller 10 executes the data-in of the write data of one stream to the NAND memory 20 among the write data stored in the write buffer 302 for one logical page LPG (S301).

The process of S301 is executed while the target stream of the data-in is appropriately switched.

Subsequently, the operation in the second mode will be described with reference to FIGS. 13 to 15.

Figure 13:
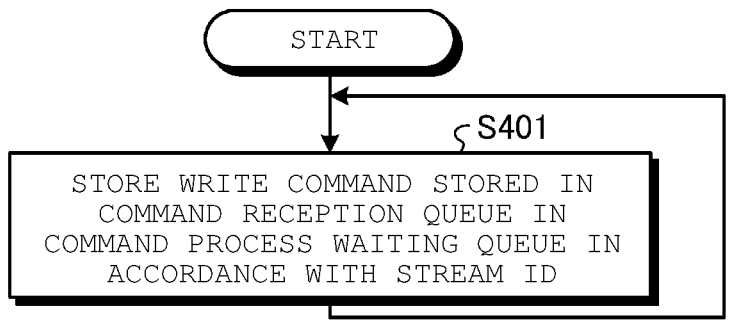
FIG. 13 is a flowchart illustrating an example of an operation in the second mode of processing the write command in the command reception queue by the memory controller according to the first embodiment.

FIG. 13 is a flowchart illustrating an example of the operation in the second mode of processing the write command in the command reception queue 301 by the memory controller 10 according to the first embodiment.

In the second mode, the memory controller 10 stores the write command in the command reception queue 301 into one of the command process waiting queues 303 corresponding to a stream ID indicated by the write command (S401).

The process of S401 is repeatedly executed.

Figure 14:
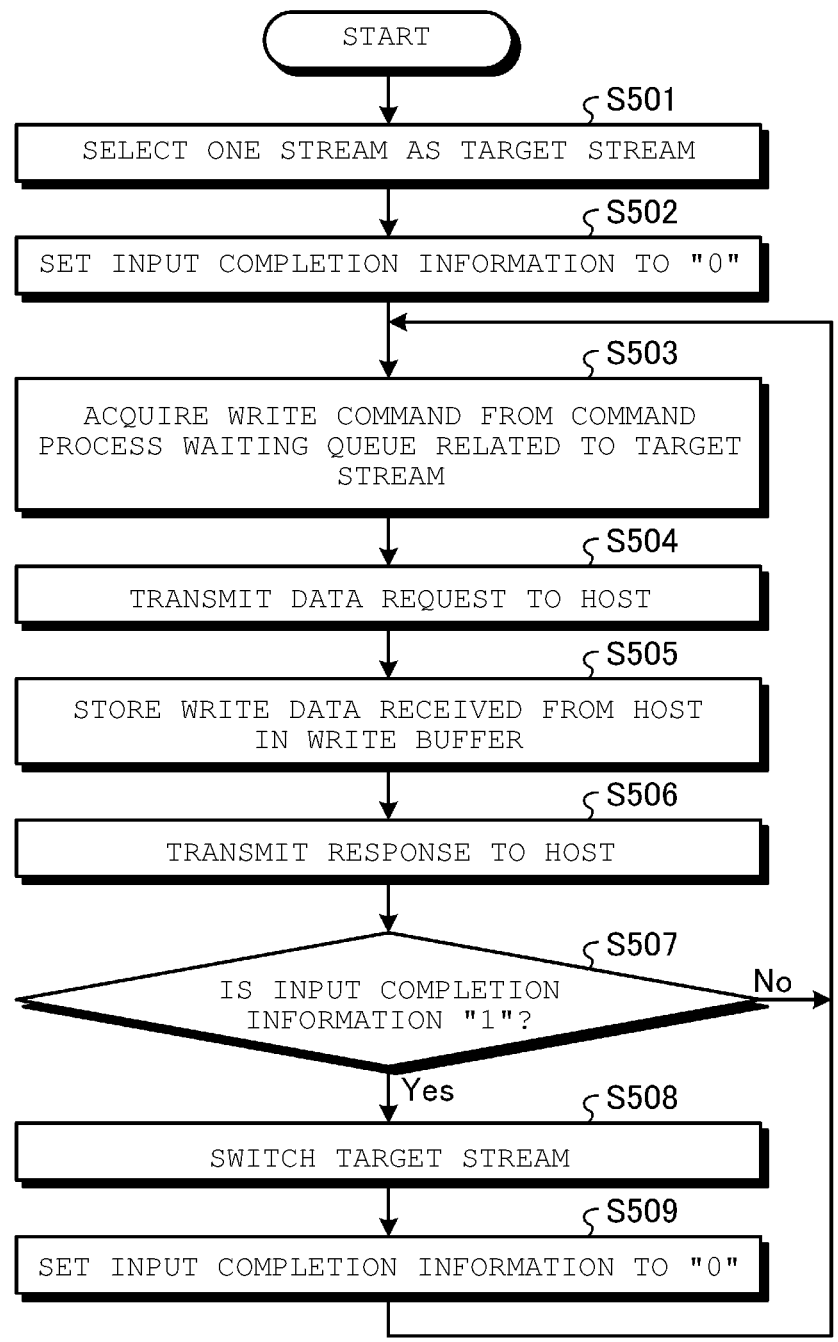
FIG. 14 is a flowchart illustrating an example of an operation in the second mode of acquiring write data by the memory controller according to the first embodiment.

FIG. 14 is a flowchart illustrating an example of the operation in the second mode of acquiring the write data by the memory controller 10 according to the first embodiment.

The processes of S503 to S506 correspond to the processes of S1 to S4 in FIG. 6, respectively.

First, the memory controller 10 selects one stream as the target stream (S501). For example, the memory controller 10 checks all the command process waiting queues 303, and if there is a command process waiting queue 303 in which the write command is stored, the memory controller 10 selects the stream corresponding to the command process waiting queue 303 as a target stream.

Subsequently, the memory controller 10 sets the input completion information 304 to "0" (S502) and acquires the write command from the command process waiting queue 303 corresponding to the target stream (S503).

The memory controller 10 transmits the data request to the host 2 according to the acquired write command (S504). When the memory controller 10 receives the write data according to the data request, the memory controller 10 stores the write data in the write buffer 302 (S505). When the storage of the write data in the write buffer 302 is completed, the memory controller 10 transmits a response to the host 2 (S506).

The data-in of the write data in the write buffer 302 to the NAND memory 20 is executed by the process described below. When the data-in of the target stream is executed for one logical page LPG, the input completion information 304 is set to "1".

The memory controller 10 determines whether the input completion information 304 is "1" (S507). When the input completion information 304 is not "1" (No in S507), the control transitions to S503.

When the input completion information 304 is "1" (Yes in S507), the memory controller 10 switches the target stream from the currently selected stream to another stream (S508). Then, the memory controller 10 sets the input completion information 304 to "0" (S509), and the control transitions to S503.

Figure 15:
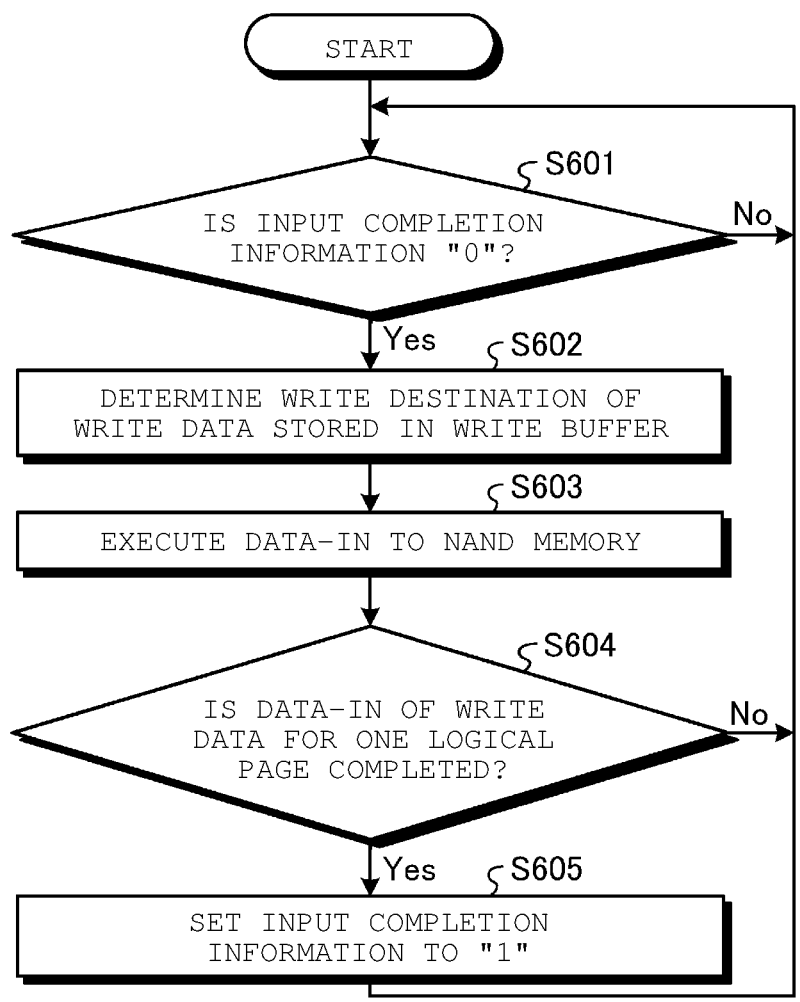
FIG. 15 is a flowchart illustrating an example of an operation in the second mode of processing write data in the write buffer by the memory controller according to the first embodiment.

FIG. 15 is a flowchart illustrating an example of the operation in the second mode of processing the write data in the write buffer 302 by the memory controller 10 according to the first embodiment.

The memory controller 10 determines whether the input completion information is "0" (S601). When the input completion information is not "0" (No in S601), the control transitions to S601.

When the input completion information is "0" (Yes in S601), the memory controller 10 determines a writing destination of the write data stored in the write buffer 302 (S602) and executes the data-in of the write data to the NAND memory 20 (S603).

Subsequently, the memory controller 10 determines whether the data-in of the write data for one logical page LPG is completed (S604). When the data-in of the write data for one logical page LPG is not completed (No in S604), the control transitions to S601. At this time, the control may transition to S602.

When the data-in of the write data for one logical page LPG is completed (Yes in S604), the memory controller 10 sets the input completion information 304 to "1" (S605), and the control transitions to S601.

As described above, according to the first embodiment, the following control is implemented by the operation of the second mode illustrated in FIGS. 13 to 15. That is, first, the memory controller 10 acquires the data of one stream for one logical page LPG from the host 2 and inputs the acquired data to the NAND memory 20. After inputting the data of one stream for one logical page LPG to the NAND memory 20, the memory controller 10 acquires the data of another stream for one logical page LPG from the host 2 and inputs the acquired data to the NAND memory 20.

Therefore, since the entire capacity of the write buffer 302 can be used for transferring the data of a single stream, the efficiency of the data transfer from the host 2 to the NAND memory 20 is improved. That is, writing performance is improved.

Further, according to the first embodiment, the memory controller 10 inputs the data acquired from the host 2 to the NAND memory 20 via the write buffer 302. The acquisition of the data of each stream from the host 2 is started after the data-in of the data of the stream, which is set as the target stream immediately before, to the NAND memory 20 for one logical page LPG is completed.

Therefore, since the entire capacity of the write buffer 302 can be used for transferring the data of a single stream, the efficiency of the data transfer from the host 2 to the NAND memory 20 is improved.

Further, according to the first embodiment, the memory controller 10 executes the control in the above-described second mode when the writing of the data of the two streams is requested and the workload ratio between the two streams is 1:1. When the workload ratio between the two streams is not 1:1, by the operation of the first mode illustrated in FIGS. 11 and 12, the memory controller 10 executes the following controls. That is, the memory controller 10 sequentially acquires the data of each stream in the write buffer 302 according to the request from the host 2. Then, the memory controller 10 executes a process of inputting the data of one stream among the data stored in the write buffer 302 to the NAND memory 20 until the amount of the input data reaches that for the one logical page LPG. When the input of the data for one logical page LPG is completed, the memory controller 10 executes a process of inputting the data of another stream among the data stored in the write buffer 302 to the NAND memory 20 until the amount of the input data reaches that for the one logical page LPG.

When the control in the second mode is executed in the case where the workload ratio between the data of the two streams of which the writing is requested from the host 2 is far from 1:1, the processing becomes complicated, and the writing performance deteriorates. In the first embodiment, the control in the second mode is performed when the workload ratio between the data of the two streams is 1:1. Therefore, the deterioration of the writing performance is prevented.

It is noted that the memory controller 10 does not necessarily have to execute the switching between the first mode and the second mode. When processing the write command, the memory controller 10 may always execute the control in the second mode.

Further, according to the first embodiment, the memory system 1 includes the command process waiting queue 303 for each stream. In the second mode, the memory controller 10 stores the write command received from the host 2 in the command process waiting queue 303 in accordance with the stream. Then, the memory controller 10 acquires the write command to be processed from the command process waiting queue 303 corresponding to the stream set as the target stream.

Therefore, the write command corresponding to the non-target stream causes processing to wait until the non-target stream is set as the target stream.

Second Embodiment

There may be a case where, while a memory controller 10 is executing writing in the second mode, a workload ratio between two streams of which writing is requested from a host 2 may significantly deviate from 1:1 and the number of received write commands corresponding to a stream (non-target stream) that is not a target stream is increased rapidly.

In a second embodiment, when the memory controller 10 detects that the number of received write commands for the non-target stream is increased rapidly in the second mode, the memory controller 10 immediately sets the non-target stream as the target stream.

Hereinafter, an operation of the memory system 1 according to the second embodiment will be described below. It is noted that, herein, the same matters as in the first embodiment will be omitted or briefly described.

Figure 16:
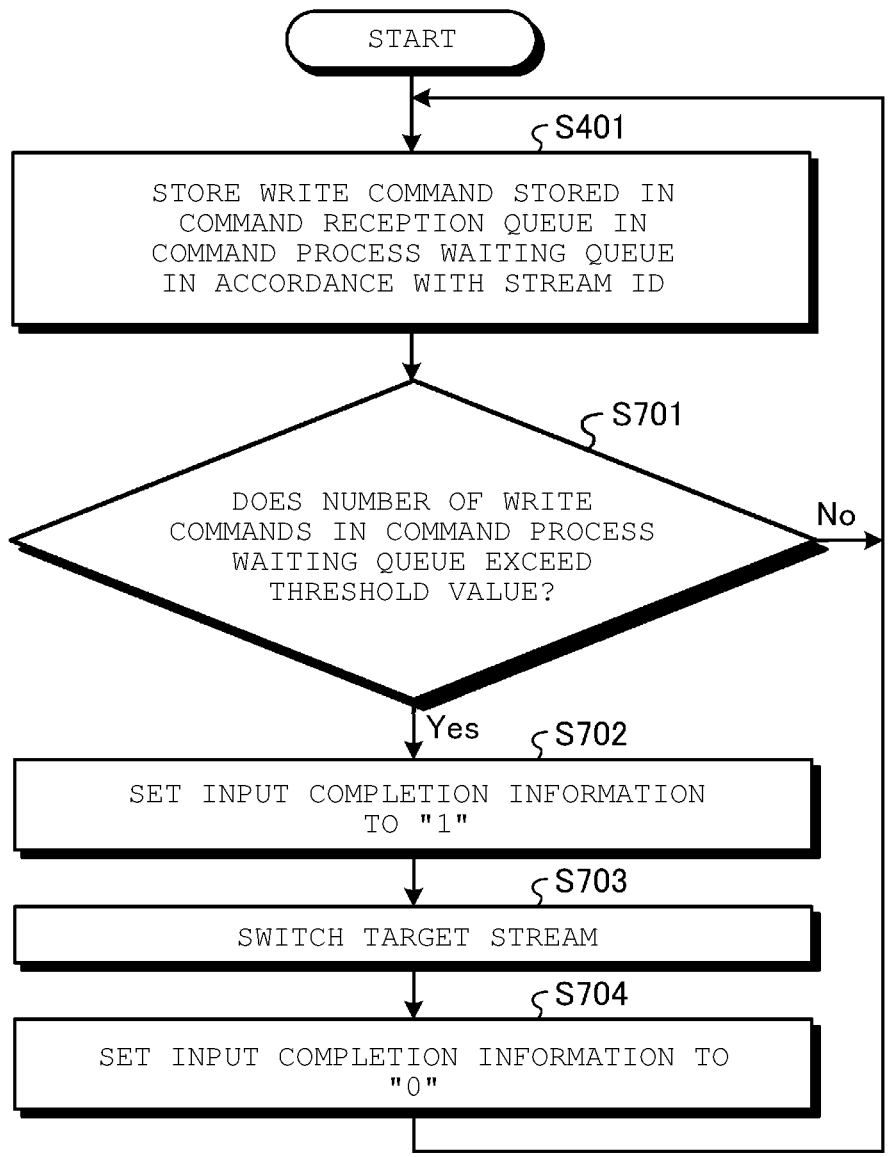
FIG. 16 is a flowchart illustrating an example of an operation in the second mode of processing a write command in a command reception queue by a memory controller according to a second embodiment.

FIG. 16 is a flowchart illustrating an example of an operation in the second mode of processing the write command in the command reception queue 301 by the memory controller 10 according to the second embodiment.

In the second mode, the memory controller 10 stores the write command stored in the command reception queue 301 into one of the command process waiting queues 303 corresponding to the stream ID indicated by the write command (S401).

In the second embodiment, after S401, the memory controller 10 determines whether the number of write commands in the command process waiting queue 303 of any of the storage destinations of the write commands exceeds a threshold value (S701). When the number of write commands in the command process waiting queue 303 of the storage destination of the write commands does not exceed the threshold value (No in S701), the control transitions to S401.

When the number of write commands in the command process waiting queue 303 of the storage destination of the write command exceeds the threshold value (Yes in S701), the memory controller 10 sets the input completion information 304 to "1" (S702). By setting the input completion information 304 to "1", the memory controller 10 stops the process of acquiring the data from the write buffer 302 and inputting the acquired data to the NAND memory 20 (refer to, for example, S601 after S605 in FIG. 15).

Following S702, the memory controller 10 switches the target stream from the currently selected stream to the stream corresponding to the command process waiting queue 303 in which the number of write commands exceeds the threshold value in the determination process of S701 (S703). Then, the memory controller 10 sets the input completion information 304 to "0" (S704). By setting the input completion information 304 to "0", the memory controller 10 starts the process of acquiring the data from the write buffer 302 and inputting the acquired data to the NAND memory 20 (refer to, for example, S601 in FIG. 15).

After S704, the control transitions to S401.

As described above, according to the second embodiment, when the number of write commands in the command process waiting queue 303 corresponding to a non-target stream exceeds the threshold value before the data-in of the data for the logical page LPG is completed, the memory controller 10 stops the acquisition of the data of the current target stream from the host 2 and the data-in of the data of the current target stream to the NAND memory 20. Then, the memory controller 10 sets the stream in which the number of write commands in the command process waiting queue 303 exceeds the threshold value as a new target stream and starts the acquisition of the data of the new target stream from the host 2 and the data-in of the data of the new target stream to the NAND memory 20.

Therefore, when the number of received write commands corresponding to the non-target stream is increased rapidly while the memory controller 10 is executing the writing in the second mode, the memory controller 10 can detect that the number of received write commands corresponding to the non-target stream is increased rapidly and immediately set the non-target stream as the target stream. Therefore, it is possible to preferentially execute the writing of the stream in which the number of received write commands is increased rapidly.

Third Embodiment

There may be a case where, while the memory controller 10 is executing writing in the second mode, a workload ratio between two streams of which writing is requested from a host 2 may significantly deviate from 1:1 and thus, the number of received write commands corresponding to the target stream is decreased rapidly.

In a third embodiment, when the memory controller 10 detects that the number of received write commands corresponding to the target stream is decreased rapidly in the second mode, another non-target stream is immediately set as the target stream.

An operation of the memory system 1 according to the third embodiment will be described below. It is noted that, herein, the same matters as in the first embodiment will be omitted or briefly described.

Figure 17:
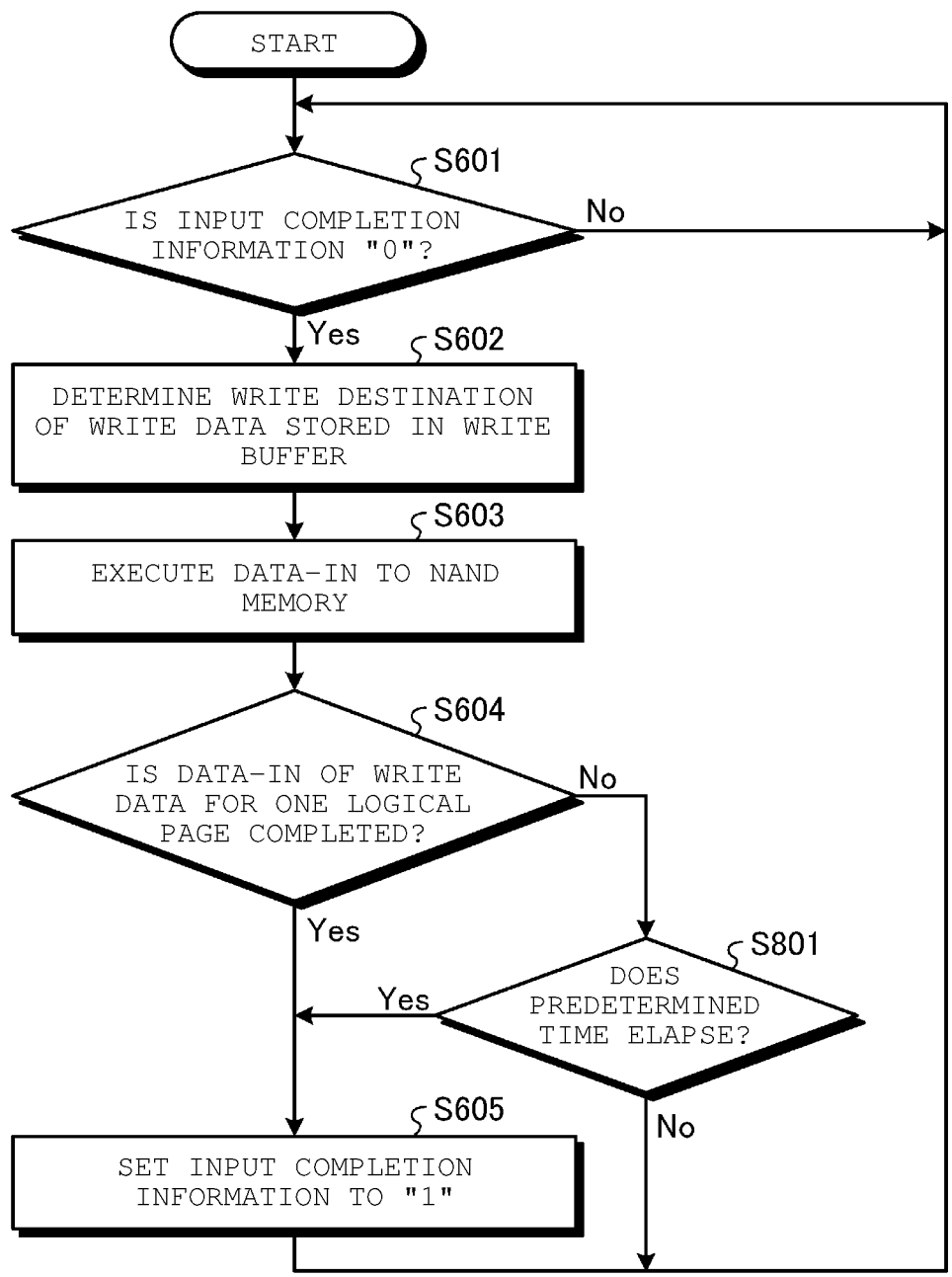
FIG. 17 is a flowchart illustrating an example of an operation in the second mode of processing write data in a write buffer by a memory controller according to a third embodiment.

FIG. 17 is a flowchart illustrating an example of an operation in the second mode of processing the write data in the write buffer 302 by the memory controller 10 according to the third embodiment.

From S601 to S604, the memory controller 10 executes the same processing as the processing of the first embodiment described with reference to FIG. 15.

In S604, the memory controller 10 determines whether the data-in of the write data for one logical page LPG is completed. When the data-in of the write data for one logical page LPG is not completed (No in S604), the memory controller 10 determines whether a predetermined time elapses from the start of the data-in of the data of the target stream (S801).

The memory controller 10 recognizes a timing when the memory controller 10 detects that the input completion information changes from "1" to "0" by the process of S601 after the change of the input completion information from "1" to "0" as the start timing of the data-in of the data of the target stream. That is, in S801, the memory controller 10 determines whether an elapsed time from a timing when the memory controller 10 detects that the input completion information changes from "1" to "0" by the process of S601 reaches a predetermined time.

The predetermined time is a time required to execute the data-in of the write data of one stream for one logical page LPG. The predetermined time is determined, for example, on the basis of the data-in time measured by S101 in FIG. 10. For example, the memory controller 10 may set the longer data-in time between the data-in times of the two streams as the predetermined time. Alternatively, the memory controller 10 may set a time obtained by adding a margin to the longer data-in time between the data-in times of the two streams as the predetermined time. The method of setting the predetermined time is not limited to these.

When the predetermined time elapses since the start of data-in of the data of the target stream (Yes in S801), the memory controller 10 sets the input completion information 304 to "1" (S605), and the control transitions to S601. When the predetermined time does not elapse since the start of data-in of the data of the target stream (No in S801), the process of S605 is skipped and the control transitions to S601.

When the data-in of the write data for one logical page LPG is completed (Yes in S604), similarly to the first embodiment, the memory controller 10 sets the input completion information 304 to "1" (S605), and the control transitions to S601.

As described above, according to the third embodiment, when a predetermined time elapses from the start of the data-in of the write data corresponding to the target stream before the data-in of the data for the logical page LPG is completed, the memory controller 10 executes switching of the target stream by stopping the acquisition of the data of the current target stream from the host 2 and the data-in of the data of the current target stream to the NAND memory 20.

Therefore, when the number of received write commands corresponding to the target stream in the second mode is decreased rapidly while the memory controller 10 is executing the writing in the second mode, another non-target stream can be immediately set as the target stream. Therefore, the writing in the state of waiting for the reception of the write command corresponding to the target stream is prevented from being stopped.

It is noted that the third embodiment can be used in combination with the second embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
   a non-volatile memory; and
   a memory controller configured to:
   queue write commands received from a host; and
   when first and second write commands are queued,
   wherein the first write command is an instruction to write first write data associated with a first stream and the second write command is an instruction to write second write data associated with a second stream, repeatedly perform a sequence of a first operation of acquiring a predetermined amount of the first write data from the host and then transmitting the predetermined amount of the first write data to the non-volatile memory, and a second operation of acquiring the predetermined amount of the second write data from the host and then transmitting the predetermined amount of the second write data to the non-volatile memory,
   wherein the second operation in the sequence is started after completion of the first operation in the sequence.

2. The memory system according to claim 1, wherein the memory controller is configured to write the predetermined amount of the first write data into a first region of the non-volatile memory associated with the first stream in parallel with writing of the predetermined amount of the second write data into a second region of the non-volatile memory associated with the second stream.

3. The memory system according to claim 1, wherein the non-volatile memory includes a plurality of memory chips, which includes a first group of memory chips connected to the memory controller via a first wiring and a second group of memory chips connected to the memory controller via a second wiring, each of the plurality of memory chips being configured to store data in a plurality of pages,
the predetermined amount is equal to a total size of a set of pages made up of one page from each of the plurality of memory chips.

4. The memory system according to claim 1, wherein the first operation in a next sequence immediately after the sequence is started after completion of the second operation in the sequence.

5. The memory system according to claim 1, wherein the memory controller is configured to select an operational mode from a plurality of modes, and repeatedly perform the sequence of the first and second operations when the selected operational mode is a first mode.

6. The memory system according to claim 5, wherein the memory controller is configured to, when the selected operational mode is a second mode, repeatedly perform a second sequence of a third operation of acquiring at least a part of the first write data from the host and then transmitting the predetermined amount of the first write data to the non-volatile memory, and a fourth operation of acquiring at least a part of the second write data from the host and then transmitting the predetermined amount of the second write data to the non-volatile memory, and
the fourth operation in the second sequence is started before completion of the third operation in the second sequence.

7. The memory system according to claim 6, wherein the memory controller is configured to:
   determine a workload ratio of a first workload of inputting data associated with the first stream into the non-volatile memory with respect to a second workload of inputting data associated with the second stream into the non-volatile memory; and
   select the operational mode based on the workload ratio.

8. The memory system according to claim 7, wherein the memory controller is configured to select the first mode when the workload ratio is substantially 1:1, and the second mode when the workload ratio is not substantially 1:1.

9. The memory system according to claim 7, wherein the memory controller is configured to determine the first workload based on a length of time taken to transmit the predetermined amount of data associated with the first stream to the non-volatile memory, and the second workload based on a length of time taken to transmit the predetermined amount of data associated with the second stream to the non-volatile memory.

10. The memory system according to claim 6, wherein the memory controller is configured to:
    determine a number of streams for which write commands are queued, and
    select the first mode as the operational mode only when the number of streams is two.

11. A memory system, comprising:
    a non-volatile memory; and
    a memory controller configured to:
    queue write commands received from a host; and
    when first and second write commands are queued,
    wherein the first write command is an instruction to write first write data associated with a first stream and the second write command is an instruction to write second write data associated with a second stream, repeatedly perform a sequence of a first operation of acquiring a predetermined amount of the first write data from the host and then transmitting the predetermined amount of the first write data to the non-volatile memory, and thereafter a second operation of acquiring the predetermined amount of the second write data from the host and then transmitting the predetermined amount of the second write data to the non-volatile memory, wherein the memory controller is configured to terminate the first operation and start the second operation in the sequence when a predetermined condition is satisfied.

12. The memory system according to claim 11, wherein the predetermined condition includes a first condition that a number of second commands that are queued exceeds a threshold number.

13. The memory system according to claim 11, wherein the predetermined condition includes a second condition that a length of time during which transmission of the predetermined amount of the first write data to the non-volatile memory in the first operation is performed exceeds a threshold period.

14. The memory system according to claim 11, wherein the memory controller is configured to write the predetermined amount of the first write data into a first region of the non-volatile memory associated with the first stream in parallel with writing of the predetermined amount of the second write data into a second region of the non-volatile memory associated with the second stream.

15. The memory system according to claim 11, wherein
the non-volatile memory includes a plurality of memory chips, which includes a first group of memory chips connected to the memory controller via a first wiring and a second group of memory chips connected to the memory controller via a second wiring, each of the plurality of memory chips being configured to store data in a plurality of pages,
the predetermined amount is equal to a total size of a set of pages made up of one page from each of the plurality of memory chips.

16. The memory system according to claim 11, wherein the first operation in a next sequence immediately after the sequence is started after completion of the second operation in the sequence.

17. The memory system according to claim 11, wherein the memory controller is configured to select an operational mode from a plurality of modes, and repeatedly perform the sequence of the first and second operations when the selected operational mode is a first mode.

18. The memory system according to claim 17, wherein
the memory controller is configured to, when the selected operational mode is a second mode, repeatedly perform a second sequence of a third operation of acquiring at least a part of the first write data from the host and then transmitting the predetermined amount of the first write data to the non-volatile memory, and a fourth operation of acquiring at least a part of the second write data from the host and then transmitting the predetermined amount of the second write data to the non-volatile memory, and
the fourth operation in the second sequence is started before completion of the third operation in the second sequence.

19. The memory system according to claim 18, wherein the memory controller is configured to:
determine a workload ratio of a first workload of inputting data associated with the first stream into the non-volatile memory with respect to a second workload of inputting data associated with the second stream into the non-volatile memory; and
select the operational mode based on the workload ratio.

20. A method of controlling a memory system including a non-volatile memory, the method comprising:
queuing write commands received from a host; and
when first and second write commands are queued, wherein the first write command is an instruction to write first write data associated with a first stream and the second write command is an instruction to write second write data associated with a second stream, repeatedly performing a sequence of a first operation of acquiring the predetermined amount of the first write data from the host and then transmitting the predetermined amount of the first write data to the non-volatile memory, and a second operation of acquiring a predetermined amount of the second write data from the host and then transmitting the predetermined amount of the second write data to the non-volatile memory,
wherein the second operation in the sequence is started after completion of the first operation in the sequence.

* * * * *

UNITED STATES PATENT AND TRADEMARK OFFICE
CERTIFICATE OF CORRECTION

| | | |
|---|---|---|
| PATENT NO. | : 11,928,364 B2 | Page 1 of 1 |
| APPLICATION NO. | : 17/898381 | |
| DATED | : March 12, 2024 | |
| INVENTOR(S) | : Hotaka Ueki | |

It is certified that error appears in the above-identified patent and that said Letters Patent is hereby corrected as shown below:

On the Title Page

Column 1, Item (30) Please insert:
--(30) Foreign Application Priority Data
Mar. 22, 2022 (JP).....................................2022-046000--

Signed and Sealed this
Eighteenth Day of February, 2025

Coke Morgan Stewart
*Acting Director of the United States Patent and Trademark Office*